United States Patent [19]

Knowles

[11] 3,868,555

[45] Feb. 25, 1975

[54] LINE TRACING APPARATUS

[75] Inventor: John E. Knowles, Stittsville, Ontario, Canada

[73] Assignee: Instronics Ltd., Stittsville, Ontario, Canada

[22] Filed: Jan. 24, 1972

[21] Appl. No.: 220,088

[52] U.S. Cl. ............... 318/577, 318/640, 318/568, 346/31, 250/202
[51] Int. Cl. ......................................... G05b 19/36
[58] Field of Search ........... 318/576, 577, 568, 640; 346/31; 250/202

[56] References Cited
UNITED STATES PATENTS

| | | | |
|---|---|---|---|
| 2,837,046 | 6/1958 | Carson et al. | 318/576 X |
| 3,328,801 | 6/1967 | Boyle et al. | 318/576 X |
| 3,391,392 | 7/1968 | Doyle | 318/576 X |
| 3,473,157 | 10/1969 | Little et al. | 318/577 X |
| 3,505,580 | 4/1970 | Ahrens | 318/576 X |
| 3,614,372 | 10/1971 | Dulebohn | 318/577 X |
| 3,693,066 | 9/1972 | Friedman et al. | 318/576 X |
| 3,721,881 | 3/1973 | Critzer | 318/576 X |

Primary Examiner—T. E. Lynch
Attorney, Agent, or Firm—Stevens, Davis, Miller & Mosher

[57] ABSTRACT

Means for providing the X and Y coordinates of selected points on a line as the line is traced by a projected graticule controlled by a manually movable index; a movable member carrying both an optical graticule projector and a source of radiation is located below a transparent table top and is moved by servo means to follow movement of the index, which index carries radiation sensing means. The servo means operate X and Y encoders, and the operator by actuation a "read-out" switch selects those points for which the X and Y coordinates are to be provided as outputs.

12 Claims, 12 Drawing Figures

PATENTED FEB 25 1975 3,868,555
SHEET 1 OF 7
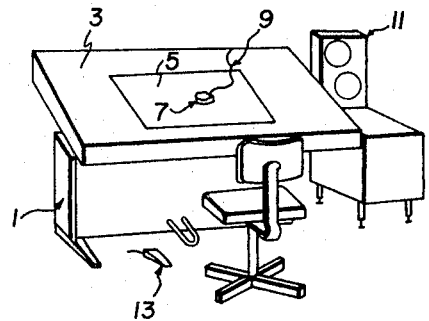
FIG. 1
FIG. 5
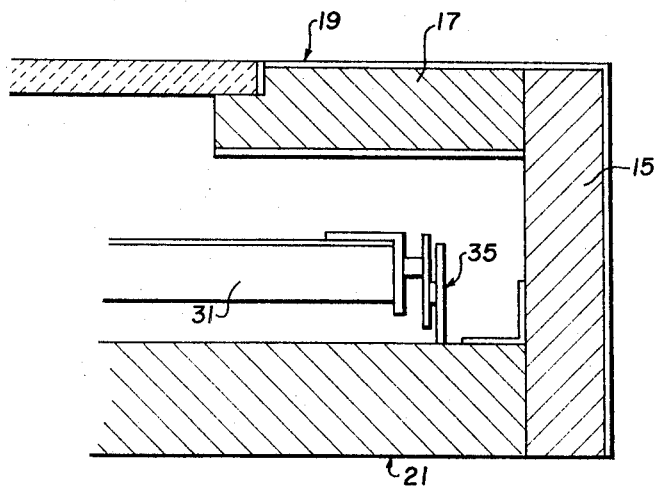

LINE TRACING APPARATUS

This invention relates to reading and writing devices which find particular application to the tracing of drawings such as maps to provide numerical data indicative of the lines of the drawings which are traced.

With the development of digital devices in connection with the inputs and the outputs of digital computers, the need has arisen for devices which will enable a curve on a map or a line on a drawing to be traced manually, and which will automatically supply the X and Y coordinates of the various points along the traced curve relative to some reference point and axis. Several devices which perform the function of curve digitizers are available. There are the automatic line followers requiring no manual control but which generally fail to function correctly where lines cross or fold back on themselves. There are the manually guided graphic digitizers which fall into three groups, one being fitted with an external arm which the operator moves to follow the curve. The second class makes use of a servo operated mechanical mechanism which automatically follows an operator directed free cursor and the third class makes use of all electronic sensing of the free cursor position. This invention relates to the servo operated type with free cursor or independent control.

With any manually operated digitizer used for graphic purposes, there are a number of sources of error relating to the cursor design and application. Some of these errors apply to the mechanical arm linked digitizers as well as free cursor type digitizers. There is the error associated with the operator's ability to locate the cursor over the point to be digitized. Obviously this error is much greater for continuous line digitizing than it is for point to point digitizing. In any case, this error relates to the degree of freedom or inertia associated with the movement of the cursor, the form of the graticule used, the illumination of the subject matter, the condition of the graticule material, the distance between the graticule and the subject matter, i.e., the parallax error and the error associated in some systems with rotating the cursor. This latter error in respect to the servo follower type digitizer is associated with the degree with which the electrical center of the cursor is indicated by the graticule. There can also be an error if the cursor's electrical field or field of eruption is tilted mechanically.

It has been found that in digitizing graphic material, the following sources of error are inherent in any servo operated digitizer: the non linearity and deadband associated with the mechanical linkage between the driven mechanism location and its associate digitizer, the environmental characteristics of the mechanical guides and linkages, the degree to which the X and Y axes guides are at right angles to one another, mechanical "slop" in the system, and the electrical deadband of the servo system. It has been found that these errors can be kept much more closely controlled than those associated with the cursor and operator.

According to the present invention, means adapted to provide the X and Y coordinates of selected points along a manually traced line, relative to a preselected origin and axis of reference, comprises: a planar table providing a transparent support for a map or drawing, or for a sheet on which a projected image is received, lines on a surface of which map, drawing or sheet are to be traced; a movable member positioned on the side of the transparent support remote from the said map, or drawing, or sheet; light projecting means carried by the movable member and arranged to project a graticle through the support onto the said surface, the position of which graticle relative to the said movable member is fixed; operator controlled means by which the said movable member can be moved to cause the said graticle to follow a desired line on the said sheet; X axis encoding means arranged to provide an indication of any change in position of the movable member along a predetermined X axis on the said sheet; Y axis encoding means arranged to provide an indication of any change in position of the movable member along a predetermined Y axis on the said sheet; and operator actuated read-out means providing when actuated an output indicative of X and Y coordinates ascertained by the two encoding means.

The invention will now be described, by way of example, with reference to the accompanying drawings, in which:

FIG. 1 is a pictorial view of a line tracing device according to the present invention;

Figure 2:
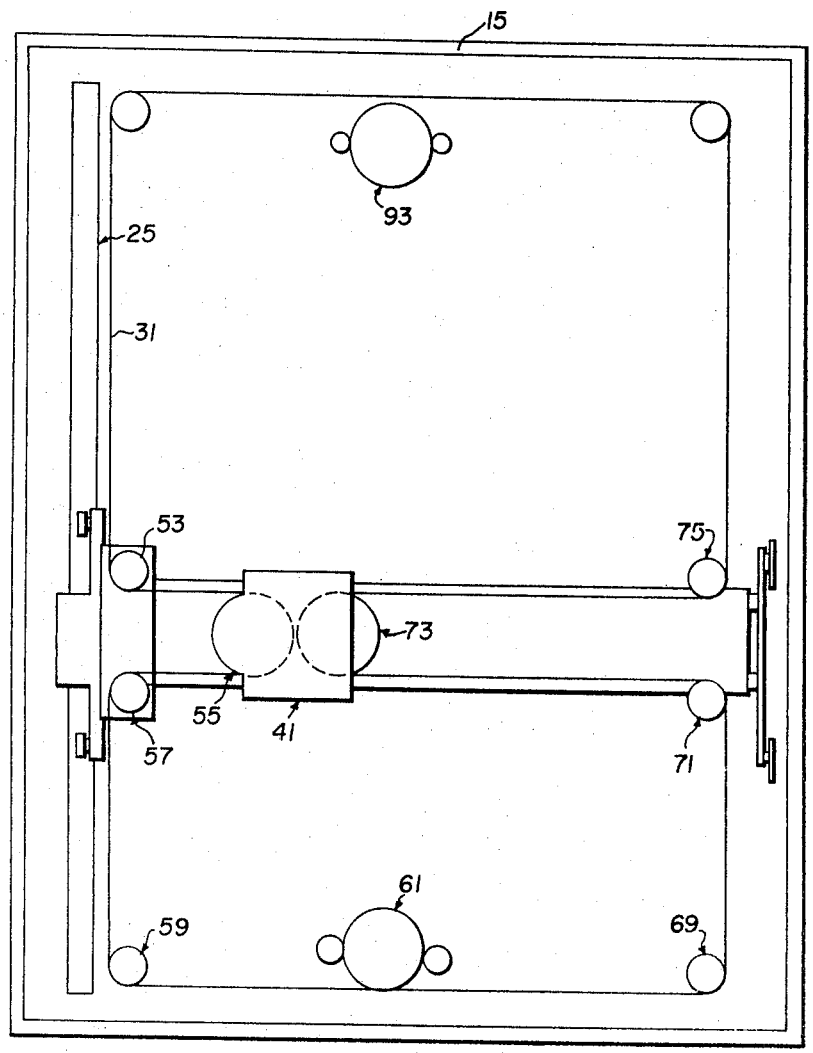
FIG. 2 is a plan view of the working parts of a planar table top shown in FIG. 1.
Figure 3:
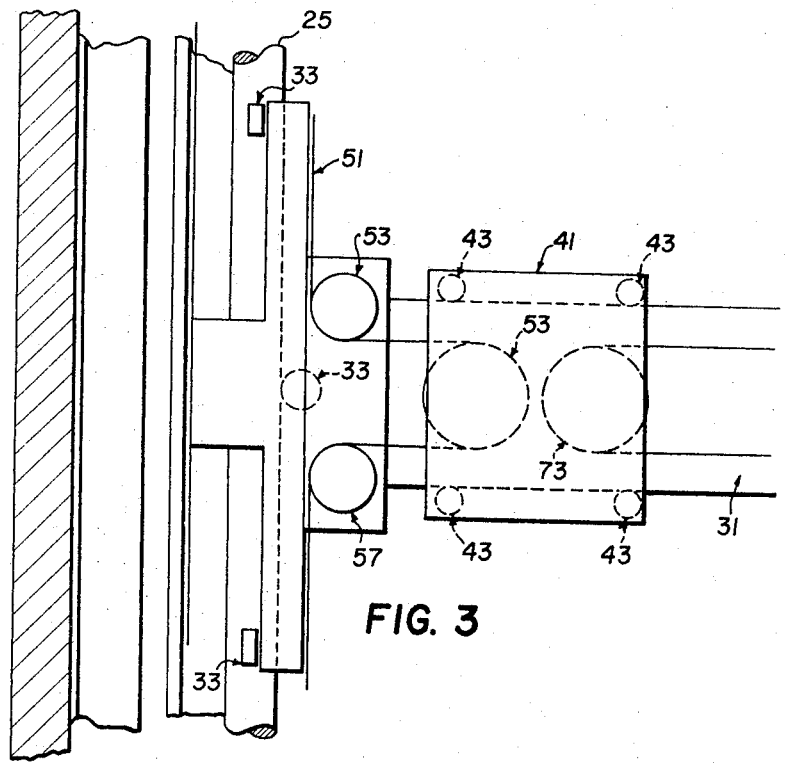
FIG. 3 is a plan view of a radiation source positioning means shown in FIG. 2, but is drawn to a larger scale than in FIG. 2.
Figure 4:
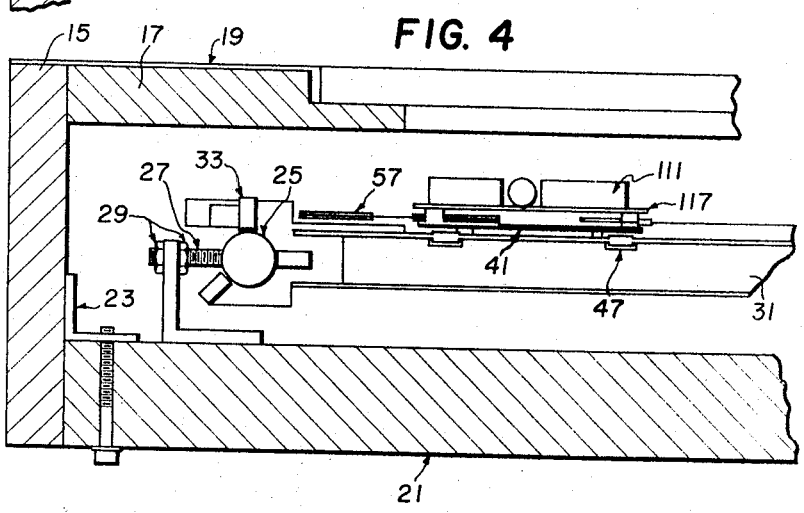
FIG. 4 is a sectional end elevation taken on the line IV—IV of FIG. 3.
Figure 6:
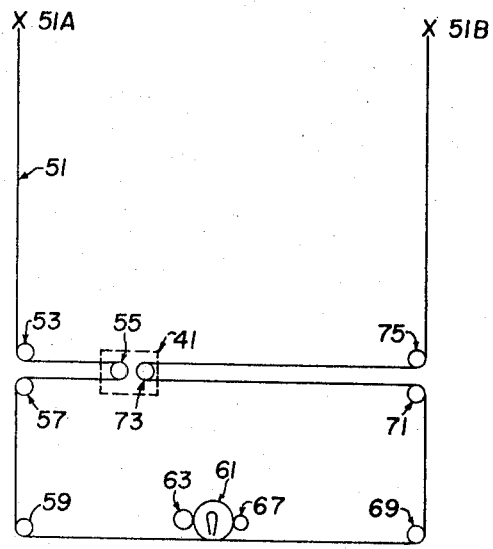
Figure 7:
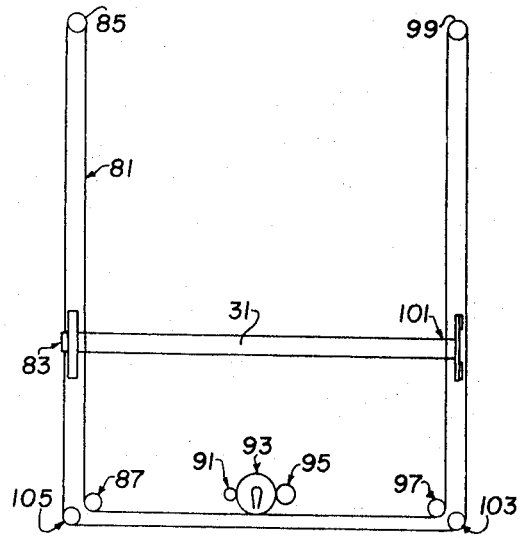
Figure 8:
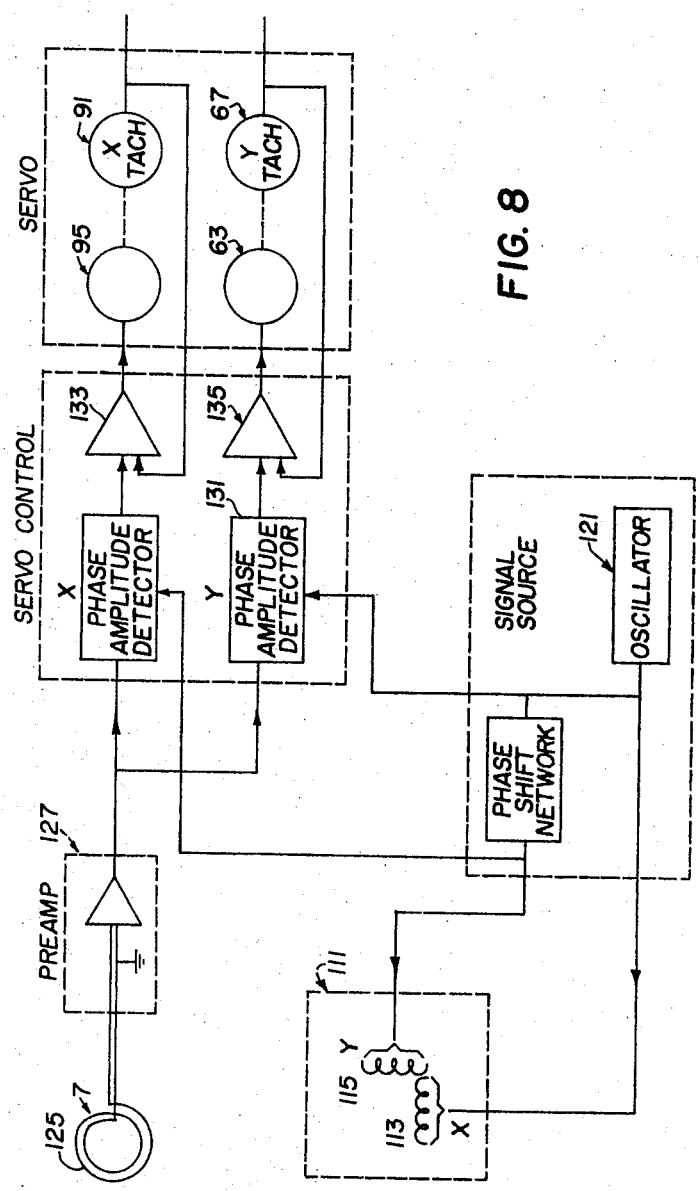
Figure 9:
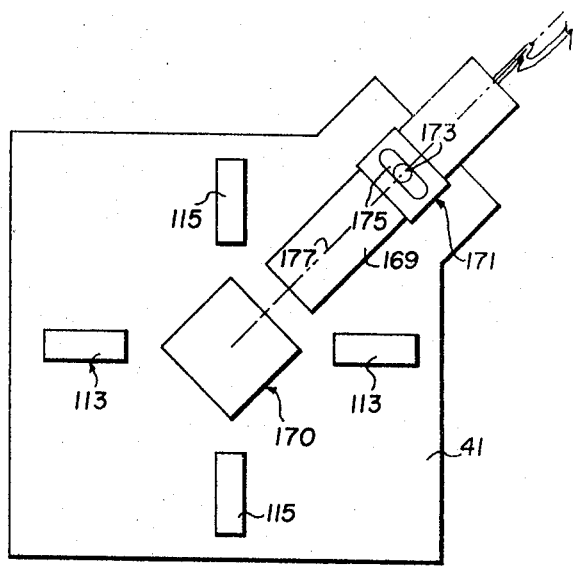
Figure 10:
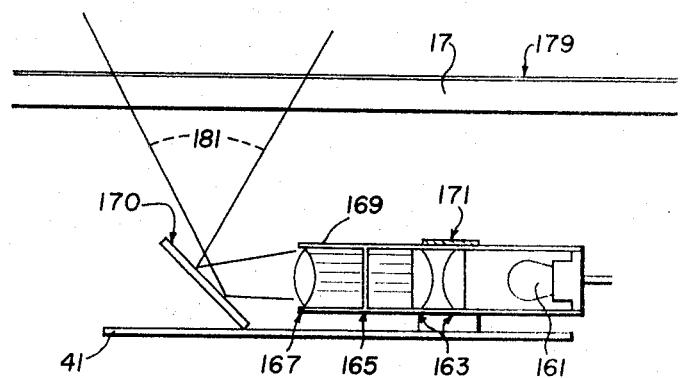
Figure 11:
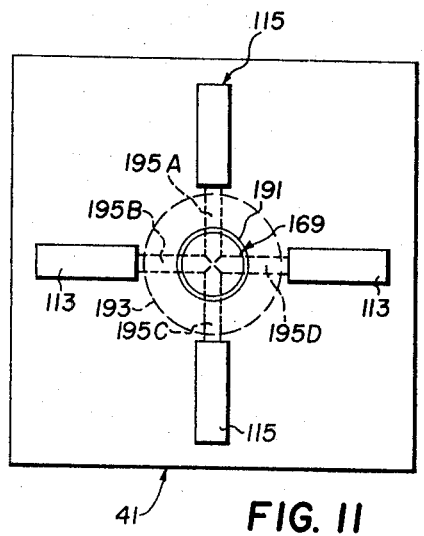
Figure 12:
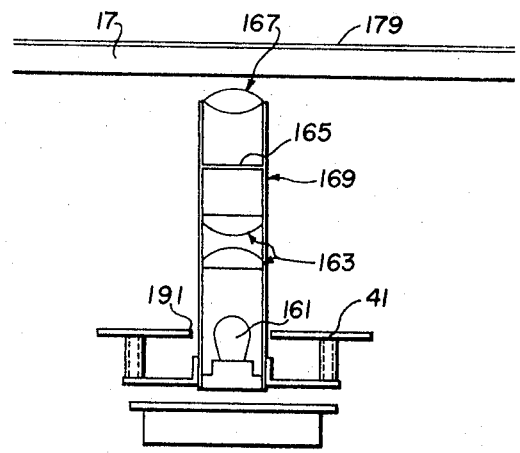

FIG. 5 (which is located on the same sheet as is FIG. 1) is a sectional end elevation taken on the line V—V of FIG. 2;

FIG. 6 is a schematic representation of Y axis servo means and encoder means included in the table top;

FIG. 7 is a schematic representation of X axis servo means and encoder means included in the table top;

FIG. 8 is a schematic circuit diagram of servo means and encoder means included in the table top;

FIG. 9 is a diagrammatic representation of a radiation source shown in FIG. 8;

FIG. 10 is a sectional side elevation taken on the line X—X of FIG. 9 and shows only a light source;

FIG. 11 is a plan view similar to FIG. 9 but showing an alternative arrangement of light source; and FIG. 12 is a sectional side elevation taken on the line XII—XII of FIG. 11.

Referring first to FIG. 1, the apparatus comprises a stand 1 carrying a planar table top 3 on which a map 5 or other drawing to be traced can be placed. An operator stands or sits in front of the drawing, and moves over a desired line of the drawing a movable free cursor or index 7 connected by a very light and flexible electrical lead 9 to associated electrical apparatus indicated generally at 11. When the operator desires the apparatus to read out the instantaneous X and Y coordinates of the point under the index, he operates a foot switch 13. Thus the operator is able to select those points at which he is satisfied that his index is properly positioned relative the drawing. In the apparatus 11, a record is made of the coordinates of the selected points, and if desired these coordinates can be displayed as say a five digit "NIXIE" display for each of the X and Y axes.

FIGS. 2 to 5 illustrate the construction of the planar table top 3, which consists of a rigid rectangular frame 15 on which is mounted a flat clear glass sheet 17. This clear glass sheet provides little hindrance to the passage of light or of electromagnetic waves having a frequency of three kilocycles. The frame 15 is secured to a base board 21 which encloses the bottom of the table top 3. Brackets 23 mounted on the frame 15 support a rigid metal rod 25 through metal stud bolts 27 welded to that rod at spaced points along its length. These bolts 27 being screwthreaded and being provided with nuts 29 enable the rod 25 to be accurately trued up once in the table top. Slidably mounted on the rod 25 is an arm 31 which extends at right angles away from the rod, the arm carrying at the bearing locations spaced apart along the rod 25 a set of four rollers 33, which engage the rod and so provide rolling rather than sliding friction. The four rollers in the set are spaced at orientations of 90 degrees and 135 degrees round the rod 25 to provide proper support, and the mounting means for these rollers enable a fine adjustment of the radial tension to be made to ensure a completely shake-free movement of the arm 31 along the rod.

At its free end, the arm 31 carries a pair of rollers mounted on a plate 37 and these rollers rest on base 21, and are tensioned against base 21 by the X and Y axes control cables.

Mounted on the arm 31 is a slider 41 provided with three rollers 43 which, by engaging accurately machined side surfaces 45 on the arm position the slider laterally of the arm and which include flanges 47 (see FIG. 4) which locate the slider vertically (in FIG. 4) on the arm. It will be seen that the slider 41 is thus accurately positioned on the arm 31, and that the arm 31 is accurately positioned in the rod 25.

FIGS. 6 and 7 indicate how the slider 41 can be moved to any desired point under a limited area of the top panel 17. Referring first to FIG. 6, a flexible steel cable 51 is anchored at its ends 51A and 51B near the upper and lower right-hand corners of the table top. This cable is threaded as shown in that Figure to extend round a pulley 53 mounted at the inward end of arm 31, round a first pulley 55 carried by the slider 41, round a further pulley 57 also mounted at the inner end of arm 31, round a fixed pulley 59 mounted near the upper left-hand corner of the table top, round the driving drum 61 of a Y servo motor 63, drum 61 also drives Y encoder round a fixed pulley 69 mounted near the lower left-hand corner of the table top, round pulley 71 mounted at the outward end of arm 31; round pulley 73 mounted on the slider 41; round a second pulley 75 mounted at the outward end of arm 31, and thus to the anchored end 51B.

Referring now to FIG. 7, this Figure shows how the arm 31 can be moved to and fro along the length of the rod 25. An endless stranded steel cable 81 extends from an anchor point 83 on the "inward" end of the arm 31 along the top of the edge of the frame 15 to a pulley 85 fixedly mounted on that frame, thence round the driving drum 93 of an X servo motor 95, drum 93 also gear drives X encoder 91 and a further fixed pulley 97, to a fixed pulley 99 at the far end of the frame 15, being fixed to an anchor point 101 at the free end of the arm 31, then extending back to a fixed pulley 103 which actually is mounted freely on the same spindle as the pulley 97, and thence extending round a pulley 105 (on the same spindle as the pulley 87) back to the anchor point 83.

Both of the cables 51 and 81 are prestressed to a tension of 8 pounds, so that they are driven positively by the associated motors and in turn drive positively the associated encoders. These encoders are of the well-known optical pulse type.

Mounted on the top of the slider 41 is a radiation source 111 (see FIGS. 4 and 9) consisting of two pairs of air-cored coils 113 and 115 arranged with their axes at right-angles to one another and mounted by suitable adhesive on resin bonded fiber plate 117. This plate is secured to the slider with such an orientation that the two coils are suitable oriented with reference to the edges of table top. Merely by way of example, the inductance of pair of coils 113, and that of the pair of coils 115, is 14 millihenrys.

Referring now to FIG. 8, this Figure shows the operation of the servo system which includes the two servo motors 63 and 95. The radiation source 111 is energized by a 3 kilocycles per second source 121 which energizes the X coil 113 directly but which energizes the Y coil 115 through a network 123 which introduces a phase shift of 90 degrees, corresponding to the physical difference in orientation of the two coils. This oscillator provides a square wave output, and this waveform is presented to the two coils which produce essentially a sine wave of flux. The manually movable index 7 includes a circular aperture for viewing a line to be followed or traced. Again merely by way of example, the index 7 is of two inches diameter and is wound with 200 turns to form pickup coil 125. This coil is connected to the input terminals of a tuned preamplifier 127, having a 20 percent pass band, which eliminates any unwanted signals picked up by the coil 125. The connecting lead 9 is suitably screened and the output from the preamplifier is applied both to an X phase amplitude detector 129 and to Y phase amplitude detector 131. Also applied to these detectors are reference square wave signals from the input and from the output of the phase-shifting network 123.

The two phase amplitude detectors thus provide signals respectively indicative of the X and Y components of the signal picked up by the coil 125. These two outputs are applied respectively to servo amplifiers 133 and 135 together with the outputs respectively of the X encoder 91 and the Y encoder 67. The action of the servo loop described is to ascertain any error in positioning of the index 7 relative to the radiation source 111, and drive the servo motor 63 and/or the servo motor 95 to reduce that error to zero.

Referring now to FIGS. 9 and 10, also mounted on the slider 41 is a light projecting system consisting of a lamp 161, a system of condenser lenses 163, a replaceable graticule 165, an object lens 167 (all of which are associated with a light excluding tube 169 painted a matt black on its inside), and a plane mirror 170 arranged in the space between the coils 113 and 115, and at an angle of 45° to the slider 41. The tube 169 is secured to the slider 41 by a clamp 171 by a bolt 173 extending through a slot 175 formed in the slider, so permitting adjustment of the axis 177 of the tube both as regards orientation and laterally, while the tube itself can be adjusted longitudinally in the clamp. When a sheet 179 of translucent paper (see FIG. 10) is placed on top of the glass sheet 17, an image of the graticule will be projected upwardly through the paper (as indicated by the lines 181) and can be viewed from above. The image is brought into proper focus by longitudinal movement of the tube 169 in the clamp 171. Although the actual position of the projected image relative to the slider 41 is not critical, it is desirable that the light beam should pass normally upwards relative to the paper sheet 179, to avoid parallax errors arising from the anomolies in the paper flatness. Further, it is desirable that in use the light beam be fixed in position relative to the four coils 113 and 115. The necessary adjustment is effected by means of appropriately setting the clamp 171 relative to the slider 41, and then tightening the bolt associated with the clamp. The manner of setting will be explained below.

In use of the apparatus described above the operator moves the index 7 along the line to be traced, the servo motors described above moving the slider 41 along the arm 31 and the arm 31 along the rod to keep the guidance radiation source 111 immediately below the line being traced. At appropriate times, the operator actuates the foot switch 13 and the outputs from the encoeers 91 and 67 are applied through terminals 141 to a suitable recording medium, magnetic tape in the example illustrated.

In more detail, when the lamp 161 is energized, a bright patch will appear on the paper sheet 179, and this patch will include a focussed image of the graticule 165. This graticule can be in the form of crossed wires, one which produces a pattern of four pointed outlines all directed towards a common central spot, which is left unobscured or any graticule form best suited to the operator or subject matter. If the movable index 7 is now placed over this patch of light, the servo system will operate to centralize the electromagnetic centre of the coil 125 in the index 7, relative to the four coils 113 and 115 on the slider 41. When this has taken place, the tube 169 is adjusted, as described above, so that the central part of the graticule is disposed centrally of the aperture in the index 7. Clearly movement of the tube 169 does not move the slider and the coils 113 and 115 relative to the index 7. It is repeated that it is not essential that the graticule be indexed centrally of the index 7, but it assists the operator if this is so.

Once the adjustment of the tube 169 is completed, it will be found that the central point of the projected image can be moved along a line by movement of the index 7, the slider 41 following the movement of the index 7 as a result of the action of the servo system.

It will be seen that the point being used to trace the line on the sheet 179 is accurately positioned at all times relative to the position of the slider 41, no servo error existing. Read-out of the coordinates of the point on the line at the central point of the projected image is effected from time to time by the operator at times when the projected image is correctly positioned on the line.

The reason why the exact position of the projected image, relative to the index 7, is unimportant is that when the coordinates of a number of points on a line are recorded, these coordinates necessarily are taken from an arbitrary zero point. Thus the effect of any displacement of the projected image from the vertical central axis of the system of coils 113 and 115 is merely a change in the effective position of the said arbitrary zero point, and remains constant. Since the index 7 acts merely as a remote positioner for the slider, its position at any time is unimportant. What is important is the position to which the slider 41 has been moved in order to follow the line being traced.

It has been found that the apparatus described can provide a high degree of accuracy in the read-out of the coordinates of a point on, say, a map, and yet the apparatus is relatively simple and cheap. The frequency of the radiation used suitably can be 3 to 9 kilocycles per second.

Referring now to FIGS. 11 and 12, these disclose an alternative arrangement of the tube 169 and the associated parts, in this arrangement the tube extending upwardly through a central aperture 191 in the slider 41. The numerals used in FIGS. 9 and 10 are also used in FIGS. 11 and 12 to indicate corresponding parts. In FIG. 11, one advantageous form for the projected light patch is indicated by the dotted lines 193. The four darker regions 195A, 195B, 195C and 195D do not converge to the same spot, but respectively to evenly spaced points spaced say 1/6 inch from the exact central spot, so that a clearly illuminated zone 1/8th inch wide exists at the central spot.

In the apparatus described and illustrated, the index 7 does not need to carry any graticule, and therefore it is not necessary for the aperture in the index 7 to contain a sheet of transparent material to carry such an index. This eliminates one of the major causes of difficulty with indexes carrying graticules, namely that of clouding of the cursor glass due to its continual rubbing on the subject matter to be traced. Further, since it is a non rotational projected image, it eliminates the rotational error associated with the previously used cursors. It also more readily permits the use of alternate shapes in graticules. The device also illuminates the work area, such illumination being glare free easily adjustable by the operator for eye comfort and general room illumination.

If the projector is small and lightweight and mounted with an associate mirror as indicated on the attached sketches, the graticule is projected upwards to the underside of the subject material. Because the majority of graphic digitizing associated with servo linked digitizers is relative to maps and diagrams, it has been found that it is quite easy to achieve an intensity on the top surface of the paper which clearly outlines the graticule being projected. It does, in fact, somewhat soften the illumination and presents a condition which is perhaps somewhat easier on the eyes of the operator than when the projection is made on to the upper surface of the subject matter. There is no need for a graticule associated with the operator's cursor, which simply becomes a coil to direct the projected graticule. In this way the inventor eliminated servo errors in the system, the projected images, of course, clearly being located where the gantry is located. It also eliminates any rotational effect because the graticule is clearly unable to rotate.

The projector can be made available with interchangeable graticules with no alignment problems provided the graticule, once located, is firmly fixed in place. To trace projected images, one covers the clear glass table top with a piece of fine white paper and projects the subject matter on to same. The graticule can then be projected as a fine cross of light or its equivalent from below and again the major causes of error in the system are eliminated.

The embodiments of the invention in which an exclusive property or privilege is claimed are defined as follows:

1. Means adapted to provide the X and Y coordinates of selected points along a manually traced line, relative to a preselected origin and axis of reference, comprising:

a. a planar table providing a transparent support for a map or drawing, or for a sheet on which a projected image is received, lines on a surface of which map, drawing or sheet are to be traced;

a movable member positioned on the side of the transparent support remote from the said map, or drawing, or sheet;

c. light projecting means carried by the movable member and arranged to project a graticle through the support onto the said surface, the position of which graticle relative to the said movable member is fixed;

d. operator controlled means, including a free cursor index manually movable by said operator to trace said lines, by which the said movable member can be moved to cause the said graticle to follow a desired line on the said sheet;

e. X axis encoding means arranged to provide an indication of any change in position of the movable member along a predetermined X axis on the said sheet;

f. Y axis encoding means arranged to provide an indication of any change in position of the movable member along a predetermined Y axis on the said sheet; and g. operator actuated read-out means providing when actuated an output indicative of X and Y coordinates ascertained by the two encoding means.

2. Coordinate providing means according to claim 1, in which the operator controlled means by which the said movable member can be moved further comprise:

servo means effective to cause the said movable member to follow automatically the said movements of the index by the operator.

3. Coordinate providing means according to claim 1, in which the operator controlled means by which the said movable member can be moved comprise:

a. a source of guidance radiation associated with and movable with the said movable member, and located on the same side of the transparent support as the movable member;

b. radiation detecting means affixed to the movable index and effective to receive radiation through the transparent support from the radiation source; and c. servo means arranged to receive an error signal from the radiation detecting means and to reposition the said movable member to correct any deviation of the positioning of the source from a position immediately opposite the radiation detecting means.

4. Coordinate providing means according to claim 3, and in which the radiation used is electromagnetic guidance radiation.

5. Coordinate providing means according to claim 4 and in which the guidance radiation used has a frequency lying in the range 3 to 9 kilocycles per second.

6. Coordinate providing means according to claim 4 and in which the guidance radiation used has frequency close to 3 kilocycles, per second.

7. Coordinate providing means according to claim 3 and in which mounting means for the movable member comprise:

a. a guide member extending parallel to one edge of the planar table;

b. an arm slidably carried by the guide member and extending away from the guide member at 90 degrees;

c. a slider carried by the arm and movable along that arm;

the radiation source being mounted on and movable with the said slider.

8. Coordinate providing means according to claim 3 and in which the manually movable index is in the form of a window, and the radiation detecting means consist of a multiturn coil mounted on and encircling the said window.

9. Coordinate providing means according to claim 3 and in which a tuned preamplifier is connected between the radiation detecting means and the servo means to eliminate at least to a large extent unwanted signals.

10. Coordinate providing means according to claim 3 and in which the radiation source comprises two coil means disposed with their axes respectively at right angles to one another.

11. Coordinate providing means according to claim 3 and in which the servo means include a first cable arranged over pulleys and arranged to move the radiation source in a direction parallel to a Y axis and a second cable arranged over pulleys and arranged to move the radiation source in a direction parallel to a X axis which is at right angles to the said Y axis.

12. Coordinate providing means according to claim 1, and in which each encoding means is an optical pulse encoder.

* * * * *